Oct. 25, 1960     L. C. CHOUINGS ET AL     2,957,553
DISC BRAKES
Filed Jan. 19, 1959     3 Sheets-Sheet 1
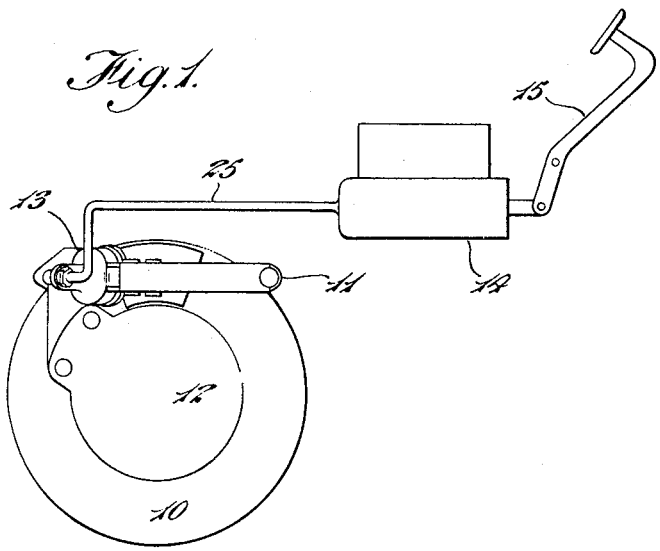
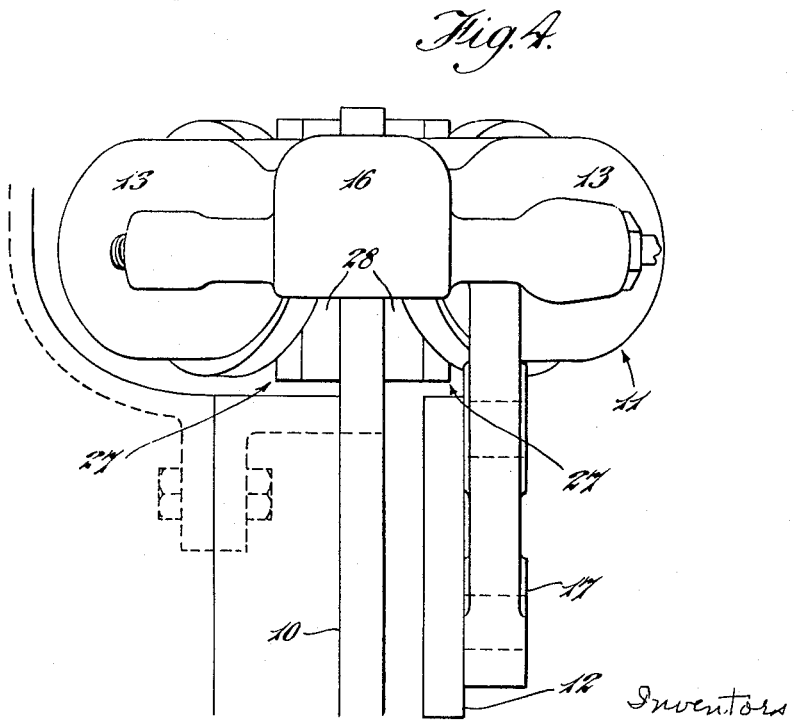
Inventors
Leslie Cyril Chouings
Percival Gordon Tweddell
By Stevens, Davis, Miller & Mosher
Attorneys Oct. 25, 1960　　L. C. CHOUINGS ET AL　　2,957,553
DISC BRAKES
Filed Jan. 19, 1959　　3 Sheets-Sheet 2
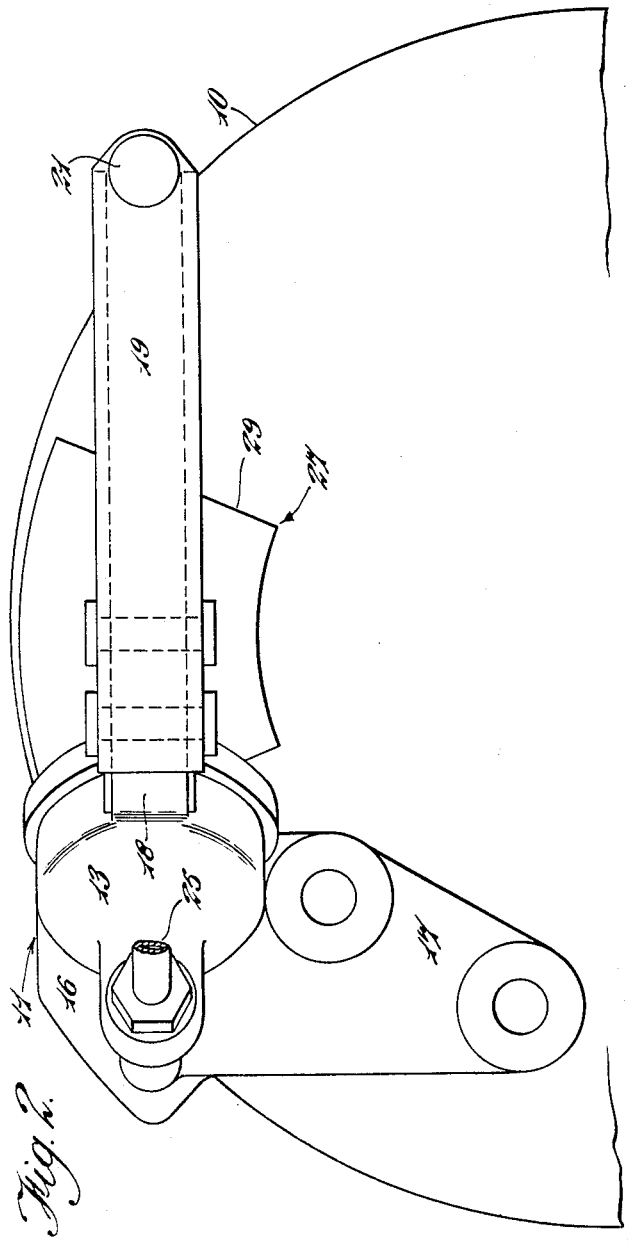
Inventors
Leslie Cyril Chouings
Perciral Gordon Treddell
By Stevens Davis Miller & Mosher
Attorneys

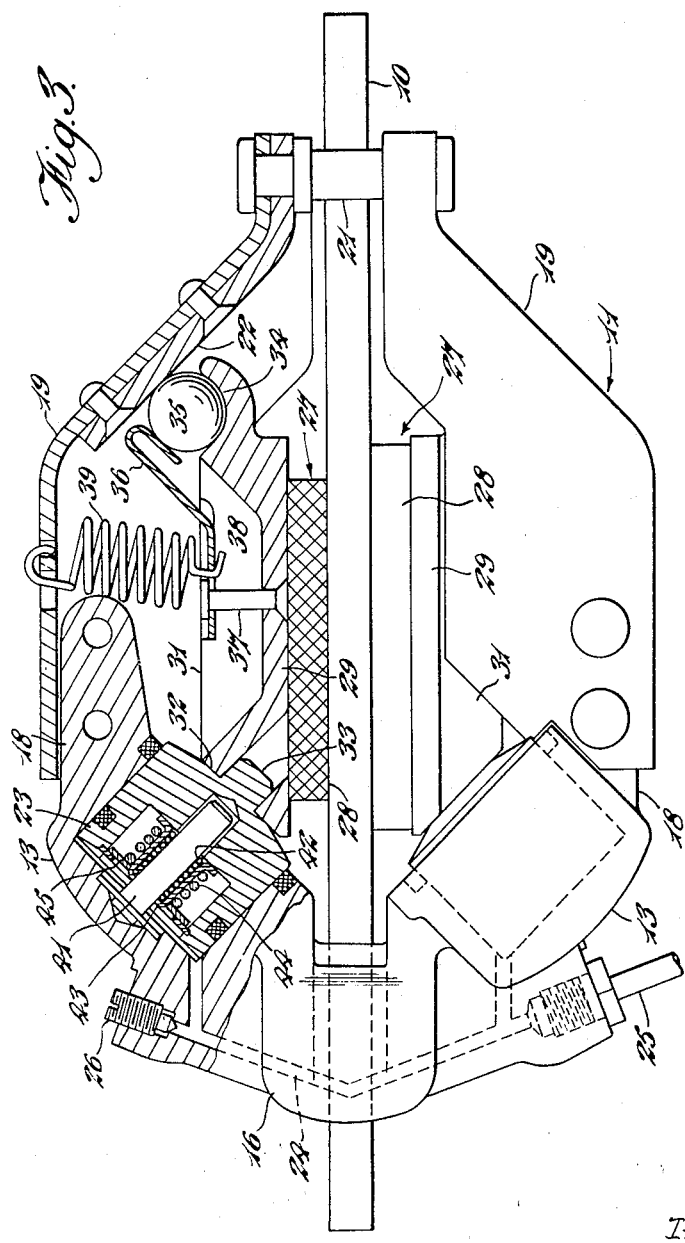

United States Patent Office 2,957,553
Patented Oct. 25, 1960

2,957,553

DISC BRAKES

Leslie Cyril Chouings and Percival Gordon Tweddell, Leamington Spa, England, assignors to Automotive Products Company Limited, Leamington Spa, England Filed Jan. 19, 1959, Ser. No. 787,659

Claims priority, application Great Britain Jan. 22, 1958

1 Claim. (Cl. 188—73)

This invention relates to disc brakes, especially disc brakes for vehicles.

Simple forms of disc brake have no self-servo action, that is to say their degree of application does not tend to be increased by the frictional drag between the moving and stationary members, and consequently the degree of effort required to operate them is greater than with shoe brakes of equivalent power, unless greater leverage is provided in the operating linkage or a booster is incorporated in the system. It has been proposed to avoid these disadvantages by modifying the disc brakes themselves to provide some degree of self-servo action, and the object of the present invention is to provide an improved form of disc brake having such self-servo action.

According to one aspect of the invention, in a disc brake comprising a disc rotatable between a pair of pads supported by a non-rotary carrier straddling a peripheral portion of the disc each of said pads is supported in the carrier for bodily movement relative thereto and is urged towards the disc to apply the brake by a thrust device acting in a plane oblique to the plane of the disc, the arrangement being such that the pads, when in contact with the disc, tend to move with the said disc during rotation of the latter, such movement increasing the pressure exerted by said pads on the disc.

According to another aspect of the invention, a disc brake comprises a non-rotatable carrier straddling the edge of said disc, a pair of pads, one on each side of the disc, supported by said carrier, guiding means in said carrier restraining said pads to move in a plane containing a chord of the disc, thrust devices acting on said pads in said plane and in a direction oblique to the plane of the disc, and means operative between said carrier and said pads to apply thrust urging said pads towards the disc in response to movement of the pads in said chordal plane.

The means operative between the carrier and the pads may comprise inclined planes on the carrier co-operating with rollers carried by the pads.

The thrust devices may act on the pads adjacent one end thereof, and the means operative between the pads and the carrier act on the said pads adjacent the other ends thereof.

The carrier may comprise a part straddling the disc and including the fluid pressure cylinders, a pair of trough-shaped members fixed to said part and constituting the guiding means, and a connecting member between the ends of said trough-shaped members remote from the part straddling the disc.

The invention is hereinafter described with reference to the accompanying drawings in which:

Figure 1 is a general view of one form of brake according to the invention and operating means for the said brake;

Figure 2 is a front elevation of the brake shown in Figure 1;

Figure 3 is a plan view of the brake shown in Figure 2, with some parts in section; and Figure 4 is an end view.

Referring to Figure 1, the brake includes a disc 10 rigidly secured to a wheel (not shown) and a carrier 11 rigidly secured to a support 12 fixed adjacent the wheel. The carrier, as will be hereinafter described supports two friction pads, one on each side of the disc, together with liquid pressure piston-and-cylinder units, one of which is shown at 13, for applying the pads to the disc. Liquid under pressure for operating the brake is conveniently supplied by a master cylinder 14 operated in the usual manner by a foot-pedal 15.

Referring to Figures 2 to 4, the carrier 11 comprises a part 16, conveniently a metal casting, bridging the edge of the disc 10 and including, on one side of the disc 10, an anchorage portion 17 adapted to be bolted to the support 12. The casting 16 includes a pair of arms 18, 18, one on each side of the disc, in a plane which includes a chord of the disc, and to each of these arms 18, 18, is secured, by rivets, a trough shaped extension 19 with its open side facing the disc, the ends of the extension 19, remote from the casting 16 being connected one to the other by a pin 21 lying outside the periphery of the disc. The extensions 19 are provided internally with longitudinally inclined surfaces, one of which is shown at 22, converging towards the connecting pin 21, and the cylinders of the piston-and-cylinder units 13, which are formed in the casting 16, have their axes in the chordal plane above referred to, the said axes being inclined to the plane of the disc as shown in Figure 3. Pistons, one of which is shown at 23, are slidably mounted in the cylinders and are arranged to be urged inwardly towards the disc by fluid pressure acting in the outer ends of the cylinders. The cylinders are interconnected by a passage 24 in the casting one end of the said passage being connected to a conduit 25 leading from the master cylinder, and the other end being closed by a screw plug 26.

On each side of the disc 10 there is provided a pad 27 comprising a block of friction material fixed to a metal backing plate 29 the block 28 and the plate 29 both being of truncated sector shape and the plate 29 having, on its rear surface, a rib 31 which is slidably engaged between the side walls of the trough-shaped extension 19 on the corresponding side of the disc. Each said rib has at one end an end surface 32 perpendicular to the axis of the cylinder-and-piston unit 13 on that side of the disc, which surface is apertured to receive a projection 33 on the piston 23, and at its other end the rib is formed with a transverse arcuate depression 34 to receive a roller 35 engaging the inclined surface 22.

The roller 35 is retained in the depression 34 by a leaf spring 36 secured to the plate 29 by a rivet 37, one end of the leaf spring resting against the edges of a slot 38 formed in the rib 31 on the backing plate. A coiled tension spring 39 one end of which is hooked into a hole in the leaf spring 36 adjacent its anchored end, and the other end of which is hooked into holes in the extension 19, tends to draw the pad 27 away from the disc 10.

The axes of the cylinder-and-piston units 13 are parallel to the inclined surfaces 22 on the corresponding sides of the disc, so that the movement of the pads 27 is also parallel to those axes, and no relative movements take place between the pistons and the pads.

The clearance between the pads 27 and the disc 10 when the brake is "off" is determined by automatic adjusting means in the cylinders of the cylinder-and-piston devices 13. In each cylinder there is mounted coaxially a stem 41 about which is coiled a spring 42 having a frictional grip on the said stem. In a recess in the back of the piston 23 there is mounted a sleeve 43 one end of which has an internal flange engaging one end of the spring 42, whilst the other end has an external flange against which bears one end of a coiled compression spring 44 the other end of which engages an abutment washer 45 in the mouth of the recess. The spring 44 tends to urge the piston backwardly relative to the sleeve 43 until the externally flanged end of the said sleeve abuts the inner end of the recess in the piston, so that the position of the piston when the brake is "off" is determined by the position of the spring 42 on the stem 41. At each brake operation, the piston moves forwardly, and, if the extent of movement is sufficient, compresses the spring 44 to such an extent that the load on the sleeve 43 overcomes the friction between the stem 41 and the spring 42, and slides the latter along the stem so that the piston returns to a new position.

The brake operates in the following manner. Liquid pressure acting in the cylinders on the pistons 23 moves the pads 27 obliquely towards the disc, and, owing to the presence of the inclined surfaces 22, the pads 27 remain parallel to the disc and engage with it substantially evenly over their whole faces. Assuming that the disc 10 is rotating clockwise as shown in Figure 2, the drag applied to the pads 27 by the rotation of the said disc tends to urge the rollers 35 down the inclined surfaces 22, and so tends to increase the pressure exerted by the pads on the disc.

The pads 27 have a radial width which is substantially greater than the width of the trough-shaped extensions 19, so that a substantial part of them is fully exposed to the air and heat can be readily dissipated therefrom.

We claim:

A disc brake comprising a rotatable disc, a carrier straddling a peripheral portion of said disc, means for holding said carrier against rotation about the disc axis, a pad disposed on each side of the disc, means on said carrier for guiding said pads for movement in a plane perpendicular to said disc and containing a chord thereof, thrust means operable to move said pads towards said disc and acting in said plane in a direction oblique to the surfaces of the disc, surfaces on said carrier parallel to the direction of action of said thrust means, and rolling members carried by said pads and engaging said surfaces to constrain said pads to move in the said direction of action said thrust means including fluid pressure cylinders carried by the carrier and said surfaces including a pair of trough-shaped members fixed to said carrier and having innersides defining the surfaces and a connecting member between the ends of said trough-shaped members remote from the carrier straddling the disc.

References Cited in the file of this patent

FOREIGN PATENTS

| | | |
|---|---|---|
| 1,142,643 | France | Apr. 1, 1957 |
| 1,019,873 | Germany | Nov. 21, 1957 |
| 754,529 | Great Britain | Aug. 8, 1956 |